Patented Sept. 17, 1940

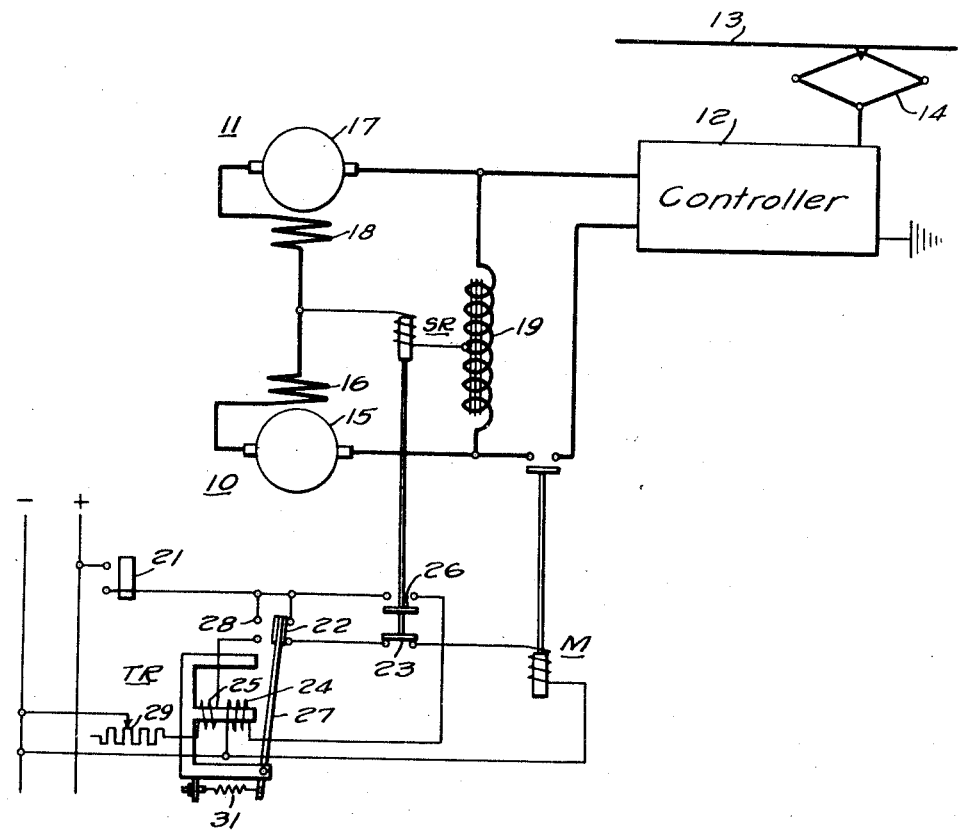

2,215,341

UNITED STATES PATENT OFFICE 2,215,341

MOTOR CONTROL SYSTEM

Thelbert L. Weybrew, Edgewood, Pa., assignor to Westinghouse Electric & Manufacturing Company, East Pittsburgh, Pa., a corporation of Pennsylvania Application February 4, 1939, Serial No. 254,606

5 Claims. (Cl. 172—179)

My invention relates, generally, to motor control systems and more particularly to systems for controlling the operation of the propelling motors of electric railway vehicles.

Railway vehicles, particularly of the alternating-current type, are usually provided with a slip relay which operates to shut off and reapply power to the traction motors when one pair of driving wheels slips with respect to another pair. In the past, the interruption of the power circuit has been only a fraction of a second in duration. In some cases, the slipping is so severe that a large amount of energy is stored in the slipping wheels, gears and driving motor armature. Thus, the interruption of power has not been long enough to discharge the stored energy and permit the wheels to cease slipping on the rails before power is again applied to the motors.

An object of my invention, generally stated, is to provide a control system for traction motors which shall be simple and efficient in operation and which may be economically manufactured and installed.

A more specific object of my invention is to provide for delaying the reapplication of power to the traction motors of a vehicle after a power interruption resulting from wheel slippage.

Another object of my invention is to provide for varying the time interval during which power is removed from the traction motors as a result of wheel slippage.

Other objects of my invention will be explained fully hereinafter or will be apparent to those skilled in the art.

In accordance with the preferred embodiment of my invention, a slip relay, which is responsive to a difference in the rotational speed of a pair of traction motors, and a time delay relay, having an adjustable timing feature, cooperate to interrupt the supply of power to the motors upon the occurrence of wheel slippage and to delay the reapplication of power for a variable time interval which may be adjusted according to the characteristics of the motors.

For a fuller understanding of the nature and objects of the invention, reference may be had to the following detailed description, taken in conjunction with the accompanying drawing, in which the single figure is a diagrammatic view of a motor control system embodying my invention.

Referring to the drawing, the system shown therein comprises a pair of motors 10 and 11, which may be of a type suitable for propelling an electric vehicle, a notching controller 12, which may be of a type well known in the art and suitable for controlling the voltage supplied to the motors 10 and 11 from a power conductor 13 through a pantograph collector 14; a switch M for connecting the motors 10 and 11 to the controller 12; a slip relay SR, and a time delay relay TR, the operation of which will be explained more fully hereinafter.

As shown, the motors 10 and 11 are connected in series-circuit relation, the motor 10 being provided with an armature winding 15 and a series field winding 16, and the motor 11 having an armature winding 17 and a series field winding 18. Each one of the motors is geared to a pair of wheels through an axle (not shown). The speed of operation of the motors may be governed by the notching controller 12, which is preferably of a type suitable for increasing the voltage applied to the motors in successive steps.

In order to interrupt the power supply to the motors in case the wheels driven by one of the pair of motors start slipping on the rails, the actuating coil of the slip relay SR is connected between the midpoint of a reactor 19, which is connected across one pair of terminals of the motors 10 and 11, and the midpoint of the series connection between the motors. Thus, under normal conditions, when the two motors are both operating at the same speed, there is no potential impressed on the slip relay coil, since the potential at the midpoint of the reactor 19 is the same as the potential at the midpoint of the motor circuit. However, if one pair of wheels and the motor which is geared to them through the axle start slipping, the balance in potential is upset by the increase in the counter-electromotive force of the motor which is slipping, and the slip relay SR operates to deenergize the switch M, thereby interrupting the power supply to the motors.

As shown, the actuating coil of the switch M is normally energized from a positive conductor through a contact segment 21, which may be on a drum controller of a type well known in the art, normally closed contact members 22 on the relay TR, and normally closed contact members 23 on the relay SR. Thus, when the slip relay SR is operated by the unbalance in voltages of the motors 10 and 11, resulting from the difference in speed caused by slipping of the wheels driven by one motor, the switch M is operated to open the power circuit to the motors.

In previous systems of the present type utilizing a slip relay, the interruption of the power circuit has been only a fraction of a second in duration, as it will be seen that potential is removed from the actuating coil of the slip relay SR as soon as the power supply to the motors is interrupted, thereby permitting the switch M to reclose and restore power to the motors.

As explained hereinbefore, such a short duration of time is not sufficient to permit adhesion to take place between the wheels and the rails under some conditions of operation, particularly with motors having heavy rotating parts. Therefore, power is reapplied to the motors before the slipping has stopped, and the slip relay is immediately operated again, which results in a pumping action of the relay and the switch M.

In order to overcome the foregoing difficulty, I have provided the time delay relay TR which cooperates with the relay SR to delay the reapplication of power to the motors for a predetermined time interval. The relay TR is provided with a main operating coil 24 and a neutralizing coil 25. When the relay SR is operated as a result of the slipping of one of the motors, the coil 24 of the relay TR is energized through contact members 26 on the relay SR. The energization of the coil 24 actuates the armature 27 of the relay TR, thereby closing a circuit for the neutralizing coil 25 through contact members 28 of the relay TR and opening the circuit for the switch M previously established through the contact members 22 of the relay TR.

Thus, when the slip relay SR is deenergized by the interruption of the power circuit and drops to its normal position, the circuit for the actuating coil of the switch M is not reestablished immediately, since the relay TR is of such a construction that it remains closed for a predetermined time interval after the interruption of the energizing circuit for the main coil 24 by the opening of the contact members 26 on the relay SR. In this manner, the reapplication of power to the motor is delayed for a sufficient time interval to permit the wheels to regain their hold on the rails before reapplying power.

In order to vary the time interval of delay to make it suitable for motors having certain characteristics, as, for example, those having heavy rotating parts, provision is made for adjusting the current in the neutralizing coil 25 by means of a variable resistor 29. It will be understood that the time required for the neutralizing coil to overcome the flux established by the main coil 24 is governed by the current permitted to flow through the winding 25, the flux of which opposes that established by the coil 24. In this manner, the timing characteristics of the relay TR may be varied in accordance with the operating characteristics of the motors 10 and 11, and the time delay interval may be adjusted within predetermined limits.

The time interval during which the relay TR remains closed after the deenergization of the winding 24 may also be adjusted by means of a biasing spring 31, which is disposed to oppose the action of the magnetic flux established by the main coil 24.

From the foregoing description it is apparent that I have provided a motor control system which is suitable for interrupting the power supply to the traction motors of an electrically propelled vehicle in the event of slipping of the wheels driven by one of a pair of motors, and for delaying the reapplication of power to the motors for an interval of time which may be varied in accordance with the operating conditions encountered in actual service. Furthermore, the system disclosed herein is relatively simple and inexpensive and may be applied readily to electric railway vehicles.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a motor control system, in combination, a pair of motors connected in series-circuit relation, means for applying power to the motors, a relay connected midway between said motors to be responsive to an unbalance in the voltages of the motors for interrupting the power supply to the motors, a time delay relay cooperating with said first-named relay to delay the reapplication of power to the motors for a predetermined time interval, said time delay relay having an actuating coil energized through the first-named relay and a neutralizing coil energized upon the operation of the time-delay relay, and means for controlling the current in the neutralizing coil to vary said time interval.

2. In a motor control system, in combination, a pair of motors connected in series-circuit relation, means for applying power to the motors, a reactor connected across one pair of the motor terminals, a slip relay having an actuating coil connected between the mid-point of the reactor and the midpoint of the series circuit for the motors to be responsive to an unbalance in the voltages of the motors for interrupting the power supply to the motors, and a time delay relay cooperating with the slip relay to delay the reapplication of power to the motors for a predetermined time interval, said time delay relay having an actuating coil energized through the slip relay and a neutralizing coil for governing the timing action of said relay.

3. In a motor control system, in combination, a pair of motors connected in series-circuit relation, means for applying power to the motors, a reactor connected across one pair of the motor terminals, a slip relay having an actuating coil connected between the midpoint of the reactor and the midpoint of the series circuit for the motors to be responsive to an unbalance in the voltages of the motors for interrupting the power supply to the motors, a time delay relay cooperating with the slip relay to delay the reapplication of power to the motors for a predetermined time interval, said time delay relay having an actuating coil energized through the slip relay and a neutralizing coil for governing the timing action of said relay, and means for controlling the current in said neutralizing coil to vary said time interval within predetermined limits.

4. In a motor control system, in combination, a pair of motors, a line switch for controlling the application of power to the motors, a slip relay responsive to an unbalance in the voltages of the motors and having contact members for deenergizing said line switch to interrupt the power supply to the motors, and an electro-responsive time-delay relay responsive to the operation of the slip relay and having contact members cooperating with the contact members on the slip relay for effecting the operation of the line switch to reapply power to the motors after a predetermined time interval.

5. In a motor control system, in combination, a pair of motors connected in series-circuit relation, a reactor connected in parallel-circuit relation to the motors, a line switch for controlling the application of power to the motors, a slip relay having an actuating coil connected between the midpoint of the reactor and the midpoint of the series circuit for the motors to be responsive to an unbalance in the voltages of the motors, contact members on the slip relay for deenergizing the line switch to interrupt the power supply to the motors, and a time-delay relay having an electro-responsive element energized as a result of the operation of the slip relay and contact members cooperating with the contact members on the slip relay for effecting the operation of the line switch to reapply power to the motors after a predetermined time interval.

THELBERT L. WEYBREW.